US012633652B2

(12) United States Patent
Ko et al.

(10) Patent No.: US 12,633,652 B2
(45) Date of Patent: May 19, 2026

(54) ANTENNA DEVICE

(71) Applicants: INVENTEC (PUDONG) TECHNOLOGY CORPORATION, Shanghai (CN); INVENTEC CORPORATION, Taipei City (TW)

(72) Inventors: Chun-An Ko, Taipei City (TW); Wen-Lin Gao, Taipei City (TW); Yu Shu Tai, Taipei City (TW); Hsin-Hung Lin, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 45 days.

(21) Appl. No.: 18/984,305

(22) Filed: Dec. 17, 2024

(65) Prior Publication Data

US 2026/0074420 A1 Mar. 12, 2026

(30) Foreign Application Priority Data

Sep. 12, 2024 (CN) ......................... 202411281476.7

(51) Int. Cl.
*H01Q 1/52* (2006.01)
*H01Q 1/38* (2006.01)
*H01Q 1/48* (2006.01)

(52) U.S. Cl.
CPC ............... *H01Q 1/521* (2013.01); *H01Q 1/38* (2013.01); *H01Q 1/48* (2013.01)

(58) Field of Classification Search
CPC ............. H01Q 1/521; H01Q 1/38; H01Q 1/48
See application file for complete search history.

(56) References Cited

U.S. PATENT DOCUMENTS

2020/0044329 A1* 2/2020 Wu .......................... H01Q 1/36
2023/0141980 A1* 5/2023 Tsai ....................... H01Q 5/378
343/893

FOREIGN PATENT DOCUMENTS

WO WO-2016112628 A1 * 7/2016 ............. H01Q 21/30

* cited by examiner

*Primary Examiner* — Dieu Hien T Duong
(74) *Attorney, Agent, or Firm* — Maschoff Brennan

(57) ABSTRACT

An antenna device includes a substrate, an excitation component and a low frequency matching component. The substrate has a first surface and a second surface facing away from each other. The excitation component is disposed on the first surface. The excitation component includes two first excitation portions and a second excitation portion spaced apart from each other. The two first excitation portions are symmetrical. Each of the two first excitation portions includes a first excitation section, a second excitation section, a third excitation section, a fourth excitation section and a fifth excitation section connected to each other. The fourth excitation sections of the two first excitation portions and the second excitation portion are adjacent to different sides of the substrate. A low frequency matching component is disposed on the second surface, and is spaced apart from sides of the substrate.

10 Claims, 8 Drawing Sheets

ANTENNA DEVICE

CROSS-REFERENCE TO RELATED APPLICATIONS

This non-provisional application claims priority under 35 U.S.C. § 119(a) on Patent Application No(s). 202411281476.7 filed in China, on Sep. 12, 2024, the entire contents of which are hereby incorporated by reference.

BACKGROUND OF THE INVENTION

Technical Field of the Invention

The invention relates to an antenna device, more particularly to an antenna device including an excitation component and a low frequency matching component.

Description of the Related Art

With the advancement of mobile communication technology, various electronic devices are evolving to offer more diversified functions, become lighter and thinner, and achieve aster and more efficient data transmission. In particular, mobile communication technology is expected to enter the WiFi 7 era, meeting various life applications and business requirements that WiFi 6E has not fulfilled. By using the frequency band of WiFi 7, the bandwidth can be expanded to enable faster communication speeds. Accordingly, the frequency band of WiFi 7 can be applied to various fields such as high-resolution video streaming, virtual reality (VR), augmented reality (AR), autonomous vehicles, industrial automation, telemedicine, smart cities, smart agriculture or smart manufacturing.

However, the return losses of the conventional antenna devices are still too high to meet communication requirements of WiFi 7. Therefore, improving the communication quality of the antenna device in the frequency band of WiFi 7 technology is one of the key issues that researchers need to address.

SUMMARY OF THE INVENTION

The invention provides an antenna device for improving the communication quality of the antenna device in the frequency band of WiFi 7 technology.

One embodiment of the invention provides an antenna device including a substrate, an excitation component and a low frequency matching component. The substrate has a first surface and a second surface facing away from each other. The excitation component is disposed on the first surface. The excitation component includes two first excitation portions and a second excitation portion spaced apart from each other. The two first excitation portions are symmetrical. Each of the two first excitation portions includes a first excitation section, a second excitation section, a third excitation section, a fourth excitation section and a fifth excitation section. An end of the second excitation section is vertically connected to an end of the first excitation section. An end of the third excitation section is vertically connected to another end of the second excitation section. The third excitation section extends along a direction away from the first excitation section. An end of the fourth excitation section is vertically connected to another end of the third excitation section, the fourth excitation section extends towards the first excitation section. An end of the fifth excitation section is vertically connected to another end of the fourth excitation section. The fifth excitation section extends towards the first excitation section. The fourth excitation sections of the two first excitation portions and the second excitation portion are adjacent to different sides of the substrate, respectively. A low frequency matching component is disposed on the second surface. The low frequency matching component is spaced apart from sides of the substrate.

According to the antenna device disclosed in the above embodiment, the first excitation portions and the second excitation portion are disposed on the first surface of the substrate, and the low frequency matching component is disposed on the second surface of the substrate, with the first excitation portions in symmetrical hook shapes, such that the antenna device can have or correspond to a frequency band to cover the frequency band of WiFi 7, and the return loss of this frequency band can be reduced so as to meet communication requirements of WiFi 7. Accordingly, the communication quality of the antenna device in the frequency band of WiFi 7 technology can be improved.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
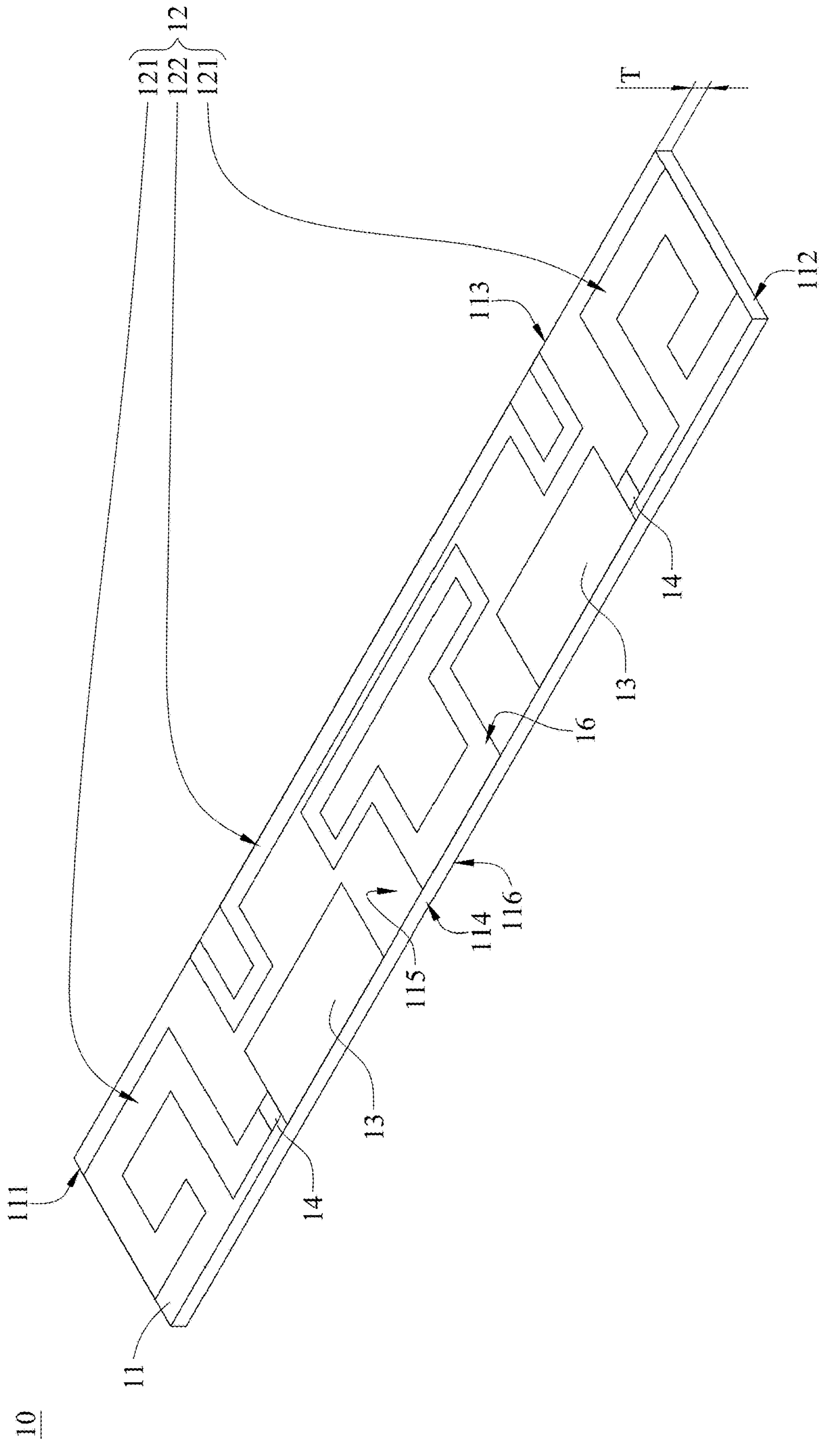
FIG. 1 is a perspective view of an antenna device in accordance with an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
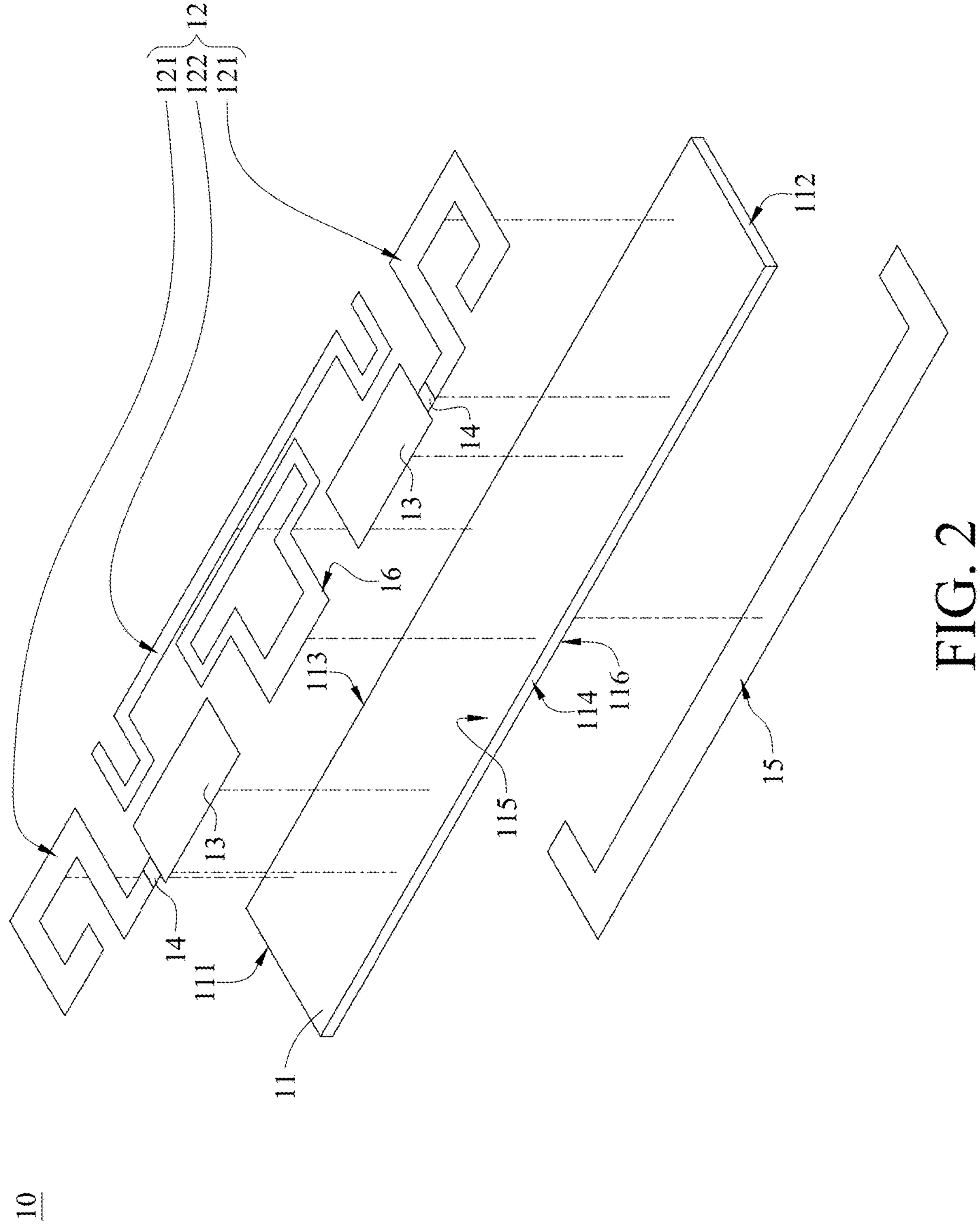
FIG. 2 is an exploded view of the antenna device in FIG. 1.

Please refer to FIG. 1 and FIG. 2, where FIG. 1 is a perspective view of an antenna device 10 in accordance with an embodiment of the invention, and FIG. 2 is an exploded view of the antenna device 10 in FIG. 1.

In this embodiment, the antenna device 10 is adapted for a frequency band of WiFi 7 (ranging from 2.16 GHz to 2.55

GHz and from 4.34 GHz to 8.5 GHz), and includes a substrate 11, an excitation component 12, two grounded components 13, two feeding components 14 and a low frequency matching component 15. The substrate 11 is made of, for example, glass fiber material, and has a first side 111, a second side 112, a third side 113, a fourth side 114, a first surface 115 and a second surface 116. The first side 111, the second side 112, the third side 113, the fourth side 114 are sequentially connected to one another. The first side 111 is located opposite to the second side 112. The third side 113 is located opposite to the fourth side 114. The first side 111, the second side 112, the third side 113 and the fourth side 114 together surround the first surface 115 and the second surface 116, and the first surface 115 and the second surface 116 face away from each other. A thickness T of the substrate 11 is, for example, 0.4 millimeters.

Figure 3:
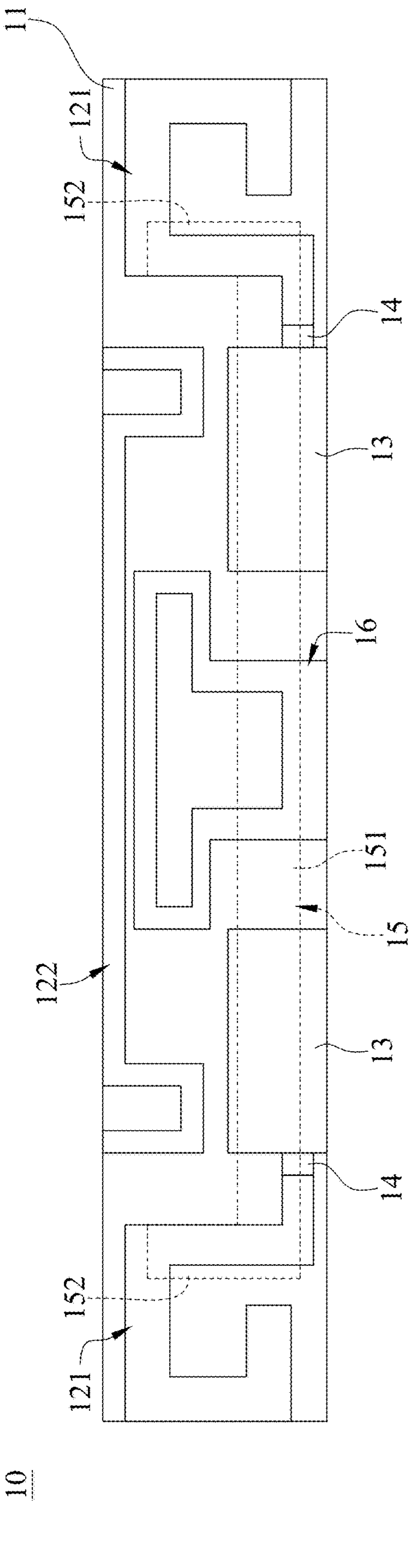
FIG. 3 is a plane view of the antenna device in FIG. 1.
Figure 4:
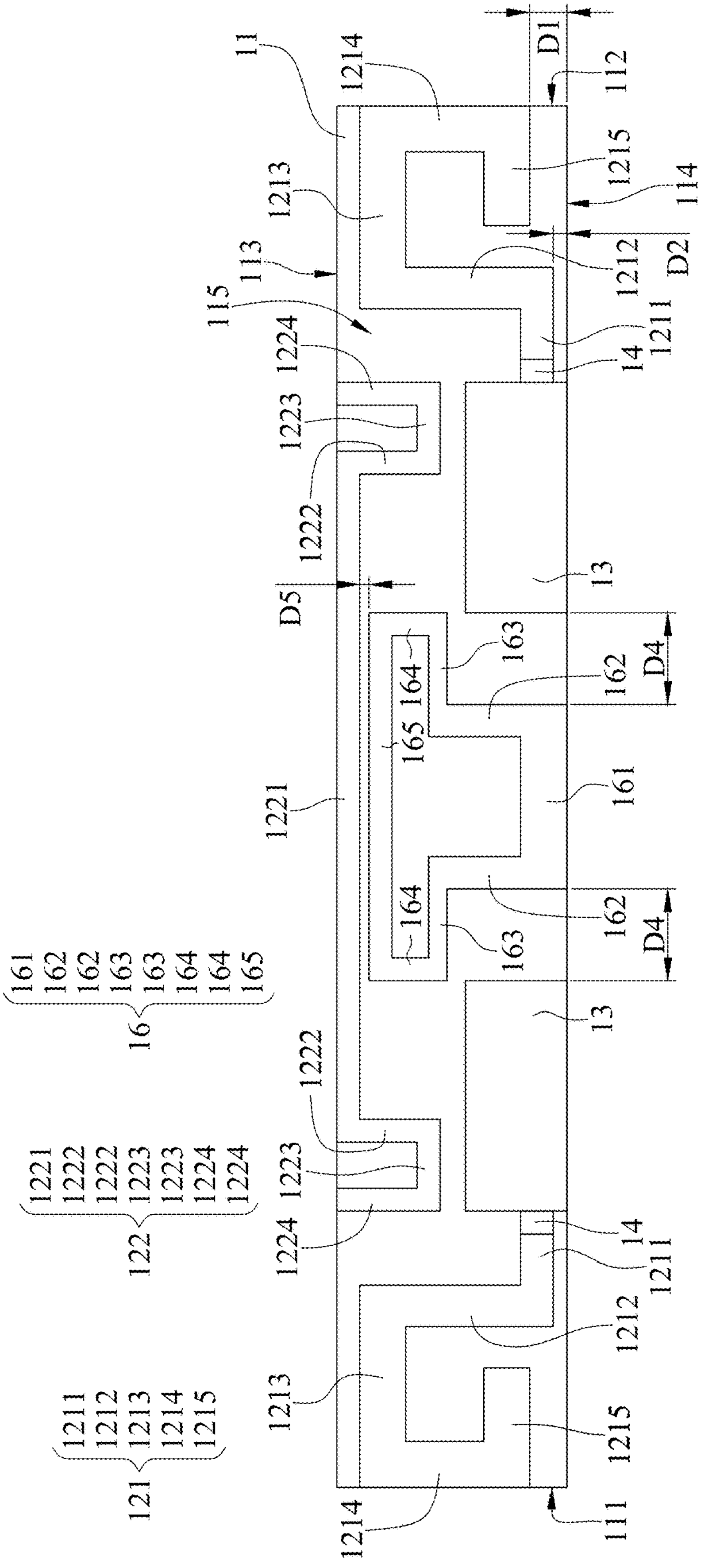
FIG. 4 is a plane view of a first surface of the antenna device in FIG. 1.
Figure 5:
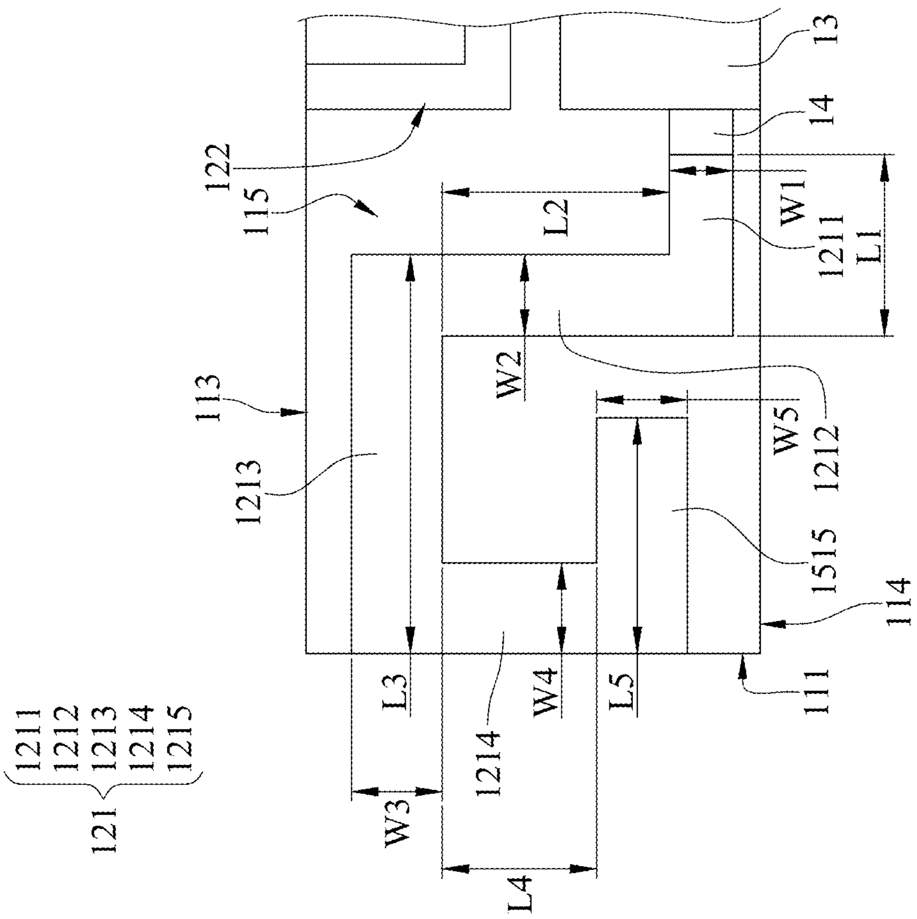
FIG. 5 is a partial and enlarged plane view of the first surface of the antenna device in FIG. 1.
Figure 6:
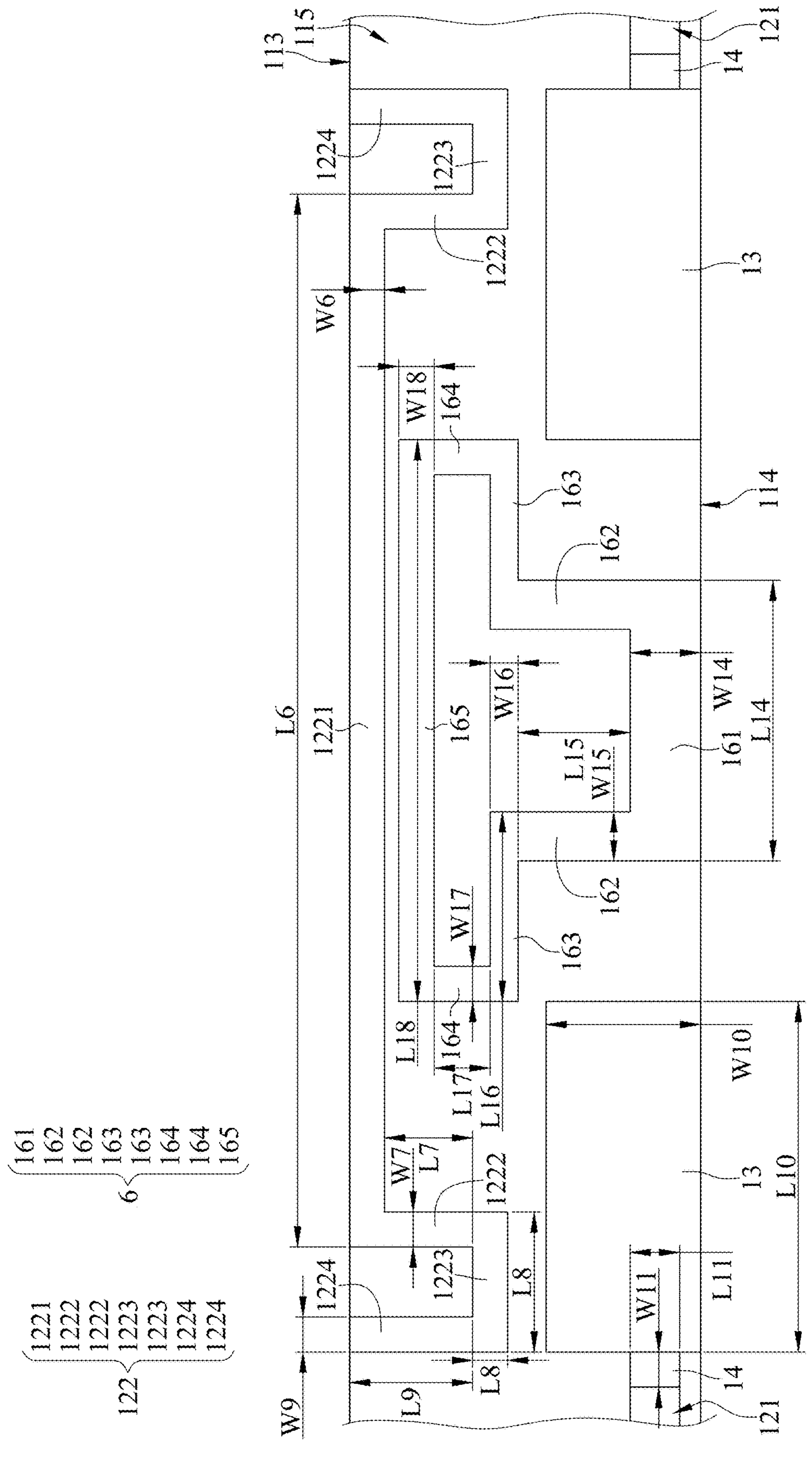
FIG. 6 is another partial and enlarged plane view of the first surface of the antenna device in FIG. 1.
Figure 7:
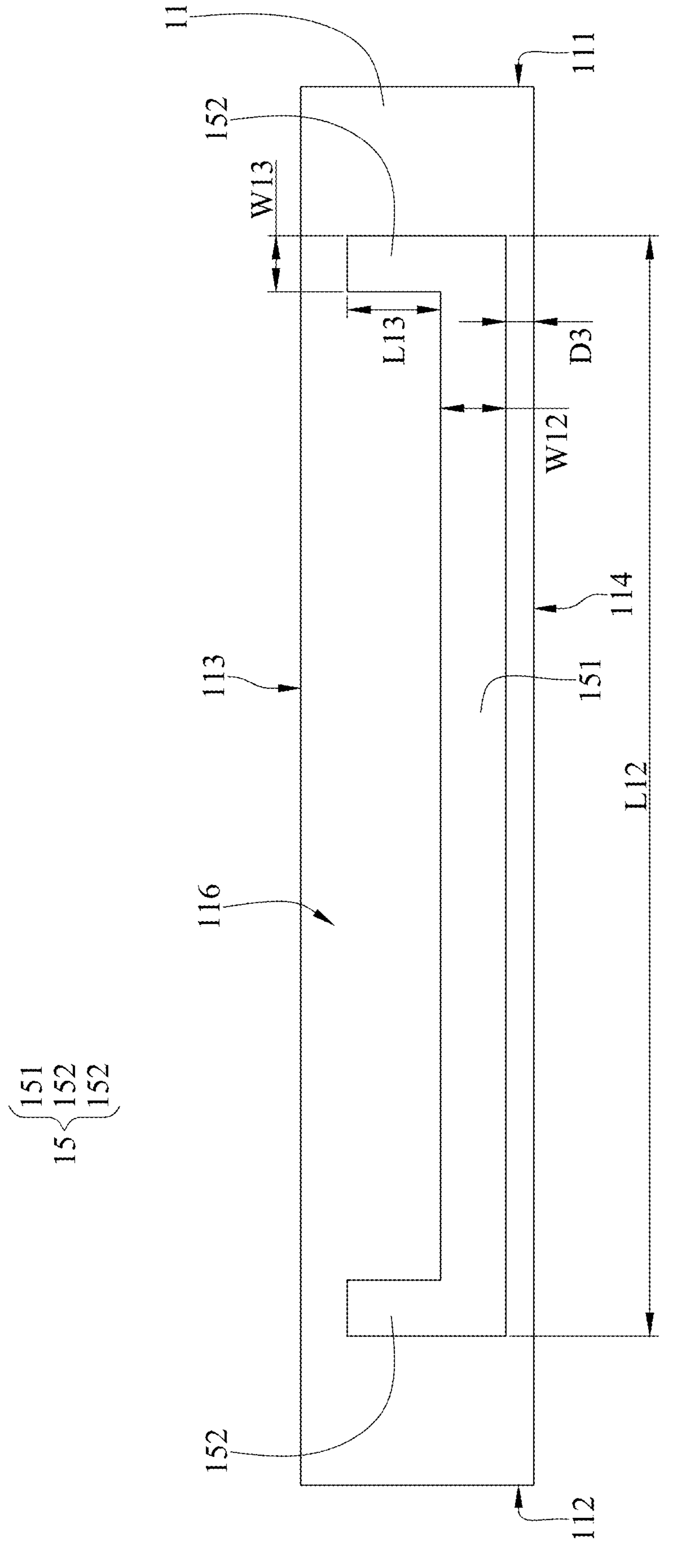
FIG. 7 is a plane view of a second surface of the antenna device in FIG. 1.

Please further refer to FIG. 3 to FIG. 7 together with FIG. 1 and FIG. 2, where FIG. 3 is a plane view of the antenna device 10 in FIG. 1, FIG. 4 is a plane view of the first surface 115 of the antenna device 10 in FIG. 1, FIG. 5 is a partial and enlarged plane view of the first surface 115 of the antenna device 10 in FIG. 1, FIG. 6 is another partial and enlarged plane view of the first surface 115 of the antenna device 10 in FIG. 1, and FIG. 7 is a plane view of the second surface 116 of the antenna device 10 in FIG. 1.

The excitation component 12 is made of, for example, copper foil, and is configured to excite the signals in the frequency band of WiFi 7. The excitation component 12 is disposed on the first surface 115, and includes two first excitation portions 121 and a second excitation portion 122 spaced apart from each other. The first excitation portions 121 are symmetrical. Each of the first excitation portions 121 includes a first excitation section 1211, a second excitation section 1212, a third excitation section 1213, a fourth excitation section 1214 and a fifth excitation section 1215. An end of the second excitation section 1212 is vertically connected to an end of the first excitation section 1211. An end of the third excitation section 1213 is vertically connected to another end of the second excitation section 1212, and the third excitation section 1213 extends along a direction away from the first excitation section 1211. An end of the fourth excitation section 1214 is vertically connected to another end of the third excitation section 1213, and the fourth excitation section 1214 extends towards the first excitation section 1211. An end of the fifth excitation section 1215 is vertically connected to another end of the fourth excitation section 1214, and the fifth excitation section 1215 extends towards the first excitation section 1211. Accordingly, each of the first excitation portions 121 is, for example, hook-shaped.

The fourth excitation sections 1214 and the second excitation portion 122 are adjacent to different sides of the substrate 11. In detail, the fourth excitation sections 1214 of the first excitation portions 121 are, for example, flush with the first side 111 and the second side 112. The second excitation portion 122 is, for example, at least partially flush with the third side 113.

Furthermore, the second excitation portion 122 includes a sixth excitation section 1221, two seventh excitation sections 1222, two eighth excitation sections 1223 and two ninth excitation sections 1224. The sixth excitation section 1221 is, for example, flush with the third side 113. Ends of the seventh excitation sections 1222 are respectively and vertically connected to two opposite ends of the sixth excitation section 1221. The seventh excitation sections 1222 extend towards the grounded components 13. Ends of the eighth excitation sections 1223 are respectively and vertically connected to two another ends of the seventh excitation sections 1222. The eighth excitation sections 1223 extend away from the sixth excitation section 1221. Ends of the ninth excitation sections 1224 are respectively and vertically connected to two another ends of the eighth excitation sections 1223. The ninth excitation sections 1224 extend away from the grounded components 13. Accordingly, two opposite ends of the second excitation portion 122 are, for example, hook-shaped. Two ends of the ninth excitation sections 1224 away from the eighth excitation sections 1223 are, for example, flush with the third side 113.

The grounded components 13 are made of, for example, copper foil, and are disposed on the first surface 115. The grounded components 13 are respectively connected to ends of the first excitation sections 1211 away from the second excitation section 1212, and are, for example, flush with the fourth side 114. The eighth excitation sections 1223 are spaced apart from the grounded components 13. The feeding components 14 are configured for signals to be fed into the antenna device 10. The feeding components 14 are located between the first excitation sections 1211 and the grounded components 13. A distance D2 between each of the feeding components 14 and the fourth side 114 is, for example, less than a distance D1 between each of the fifth excitation sections 1215 and the fourth side 114. An overall length of the second excitation portion 122 along a direction parallel to the third side 113 is, for example, less than or equal to a distance between the feeding components 14.

The low frequency matching component 15 is made of, for example, copper foil, and is configured to widen the bandwidth of the low frequency mode. The low frequency matching component 15 is disposed on the second surface 116, and is spaced apart from the first side 111, the second side 112, the third side 113 and the fourth side 114. In detail, the low frequency matching component 15 includes a first matching section 151 and two second matching sections 152. The first matching section 151 is adjacent to the fourth side 114. The two second matching sections 152 are connected to two opposite ends of the first matching section 151, respectively, and extend towards the third side 113. Accordingly, the low frequency matching component 15 is, for example, U-shaped. A distance between the second matching sections 152 is, for example, greater than the distance between the feeding components 14.

In this embodiment, the first excitation portions 121 and the second excitation portion 122 are disposed on the first surface 115 of the substrate 11, and the low frequency matching component 15 is disposed on the second surface 116 of the substrate 11, with the first excitation portions 121 in symmetrical hook shapes, such that the antenna device 10 can have or correspond to a frequency band covering the frequency band of WiFi 7, and the return loss of this frequency band can be reduced so as to meet communication requirements of WiFi 7. Accordingly, the communication quality of the antenna device 10 in the frequency band of WiFi 7 technology can be improved.

In addition, the fourth excitation sections 1214 of the first excitation portions 121 are flush with the first side 111 and the second side 112, the second excitation portion 122 is at least partially flush with the third side 113, and the grounded components 13 are flush with the fourth side 114, such that the antenna device 10 can be ensured to have or correspond to the frequency band covering the frequency band of WiFi 7, and the return loss of this frequency band can be further reduced.

In this embodiment, the antenna device 10 may further include a decoupling component 16. The decoupling component 16 is made of, for example, copper foil, and is configured to improve the isolation effect of the first excitation portions 121. The decoupling component 16 is disposed on the first surface 115, and includes a first decoupling section 161, two second decoupling sections 162, two third decoupling sections 163, two fourth decoupling sections 164 and a fifth decoupling section 165. The first decoupling section 161 is, for example, flush with the fourth side 114. Ends of the second decoupling sections 162 are respectively and vertically connected to two opposite ends of the first decoupling section 161. The second decoupling sections 162 extend towards the second excitation portion 122. Ends of the third decoupling sections 163 are respectively and vertically connected to two another ends of the second decoupling sections 162. The third decoupling sections 163 extend away from the first decoupling section 161. Ends of the fourth decoupling sections 164 are respectively and vertically connected to two another ends of the third decoupling sections 163. The fourth decoupling sections 164 extend towards the second excitation portion 122. Two opposite ends of the fifth decoupling section 165 are connected to two ends of the fourth decoupling sections 164 away from the third decoupling sections 163. Accordingly, at least part of a side of the decoupling component 16 away from the sixth excitation section 1221, for example, protrudes towards the fourth side 114. An area surrounded by the first decoupling section 161, the second decoupling sections 162, the third decoupling sections 163, the fourth decoupling sections 164 and the fifth decoupling section 165 is not provided with the copper foil. The fifth decoupling section 165 is spaced apart from the second excitation portion 122 by a distance D5. The first decoupling section 161 and at least part of the second decoupling sections 162 are located between the grounded components 13.

In this embodiment, the antenna device 10 may further include a capacitor (not shown), an inductor (not shown) or a resistor (not shown). The isolation effect of the first excitation portions 121 can be further improved through the decoupling component 16 and the capacitor, the inductor or the resistor.

In this embodiment, a length L1 of each of the first excitation sections 1211 of the first excitation portions 121 is, for example, 2 millimeters. A width W1 of each of the first excitation sections 1211 of the first excitation portions 121 is, for example, 0.7 millimeters. A length L2 of each of the second excitation sections 1212 of the first excitation portions 121 is, for example, 2.5 millimeters. A width W2 of each of the second excitation sections 1212 of the first excitation portions 121 is, for example, 0.9 millimeters. A length L3 of each of the third excitation sections 1213 of the first excitation portions 121 is, for example, 4.4 millimeters. A width W3 of each of the third excitation sections 1213 of the first excitation portions 121 is, for example, 1 millimeter. A length L4 of each of the fourth excitation sections 1214 of the first excitation portions 121 is, for example, 1.7 millimeters. A width W4 of each of the fourth excitation sections 1214 of the first excitation portions 121 is, for example, 1 millimeter. A length L5 of each of the fifth excitation sections 1215 of the first excitation portions 121 is, for example, 2.6 millimeters. A width W5 of each of the fifth excitation sections 1215 of the first excitation portions 121 is, for example, 1 millimeter. The distance D1 between each of the fifth excitation sections 1215 of the first excitation portions 121 and the fourth side 114 is, for example, 0.8 millimeters.

In this embodiment, a length L6 of the sixth excitation section 1221 is, for example, 15 millimeters. A width W6 of the sixth excitation section 1221 is, for example, 0.5 millimeters. A length L7 of each of the seventh excitation sections 1222 is, for example, 1.25 millimeters. A width W7 of each of the seventh excitation sections 1222 is, for example, 0.5 millimeters. A length L8 of each of the eighth excitation sections 1223 is, for example, 2 millimeters. A width W8 of each of the eighth excitation sections 1223 is, for example, 0.5 millimeters. A length L9 of each of the ninth excitation sections 1224 is, for example, 1.75 millimeters. A width W9 of each of the ninth excitation sections 1224 is, for example, 0.5 millimeters.

In this embodiment, a length L10 of each of the grounded components 13 is, for example, 5 millimeters. A width W10 of each of the grounded components 13 is, for example, 2.2 millimeters. A length L11 of each of the feeding components 14 is, for example, 0.7 millimeters. A width W11 of each of the feeding components 14 is, for example, 0.5 millimeters. The distance D2 between each of the feeding components 14 and the fourth side 114 is, for example, 0.3 millimeters.

In this embodiment, a length L12 of the first matching section 151 is, for example, 23.6 millimeters. A width W12 of the first matching section 151 is, for example, 1.4 millimeters. A length L13 of each of the second matching section 152 is, for example, 2 millimeters. A width W13 of each of the second matching section 152 is, for example, 1.2 millimeters. A distance D3 between the first matching section 151 and the fourth side 114 is, for example, 0.6 millimeters.

In this embodiment, a length L14 of the first decoupling section 161 is, for example, 4 millimeters. A width W14 of the first decoupling section 161 is, for example, 1 millimeters. A distance D4 between the first decoupling section 161 and each of the grounded components 13 is, for example, 2 millimeters. A length L15 of each of the second decoupling sections 162 is, for example, 1.6 millimeters. A width W15 of each of the second decoupling sections 162 is, for example, 0.7 millimeters. A length L16 of each of the third decoupling sections 163 is, for example, 2.7 millimeters. A width W16 of each of the third decoupling sections 163 is, for example, 0.4 millimeters. A length L17 of each of the fourth decoupling sections 164 is, for example, 0.8 millimeters. A width W17 of each of the fourth decoupling sections 164 is, for example, 0.5 millimeters. A length L18 of the fifth decoupling section 165 is, for example, 8 millimeters. A width W18 of the fifth decoupling section 165 is, for example, 0.5 millimeters. A distance D5 between the fifth decoupling section 165 and the second excitation portion 122 is, for example, greater than or equal to 0.2 millimeters.

In this embodiment, the second excitation portion 122 includes the sixth excitation section 1221, the two seventh excitation sections 1222, the two eighth excitation sections 1223 and the two ninth excitation sections 1224, and is hook-shaped, but the invention is not limited thereto. In other embodiments, the second excitation portion may include the sixth excitation section merely, and is, for example, strip-shaped.

In this embodiment, the antenna device 10 includes the decoupling component 16, but the invention is not limited thereto. In other embodiments, the antenna device may not include the decoupling component.

In this embodiment, the area surrounded by the first decoupling section 161, the second decoupling sections 162, the third decoupling sections 163, the fourth decoupling sections 164 and the fifth decoupling section 165 of the decoupling component 16 is not provided with the copper foil, but the invention is not limited thereto. In other embodiments, the area surrounded by the first decoupling section, the second decoupling sections, the third decoupling sections, the fourth decoupling sections and the fifth decoupling section of the decoupling component may be provided with the copper foil.

In this embodiment, the fourth excitation sections 1214 are flush with the first side 111 and the second side 112, respectively, the second excitation portion 122 is at least partially flush with the third side 113, the grounded components 13 are flush with the fourth side 114, and the first decoupling section 161 is flush with the fourth side 114, but the invention is not limited thereto. In other embodiments, the fourth excitation sections may not be flush with the first side and the second side, the second excitation portion may not be flush with the third side, the grounded components may not be flush with the fourth side, and the first decoupling section may not be flush with the fourth side.

Figure 8:
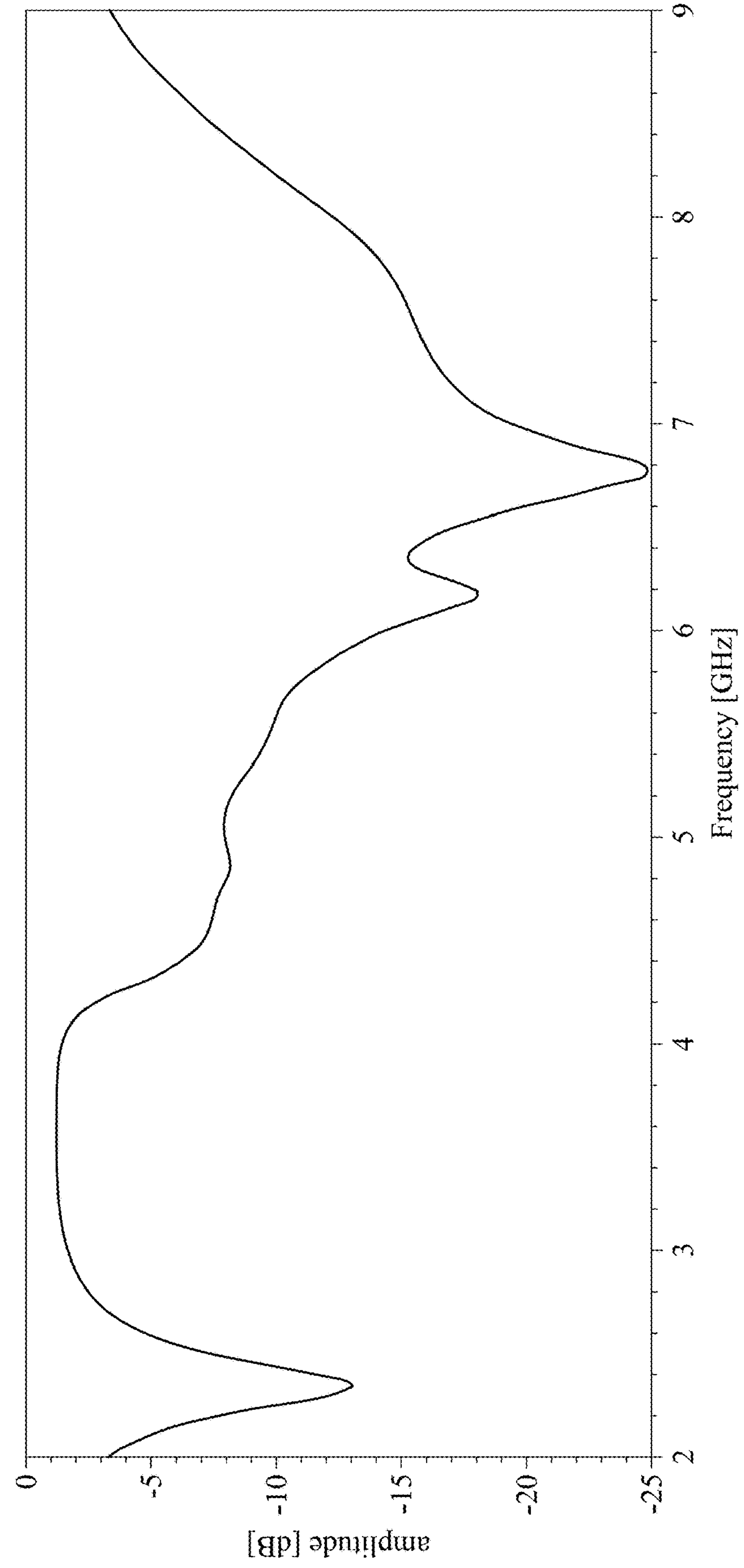
FIG. 8 is a graph showing a return loss of the antenna device in FIG. 1.

Please further refer to FIG. 8 together with FIG. 1 to FIG. 7, where FIG. 8 is a graph showing a return loss of the antenna device 10 in FIG. 1. In this embodiment, in the frequency of the low frequency mode (ranging from 2.16 GHz to 2.55 GHz) or in the frequency of the high frequency mode (ranging from 4.34 GHz to 8.5 GHz), the return loss of the antenna device 10 of this embodiment is slightly greater than −6 dB in a few frequency band. In the rest of the aforementioned frequency band, the return loss is less than −6 dB or even less than −10 dB. That is, the impedance matching of the antenna device 10 is good through the aforementioned structural design.

Generally, the higher the gain of the antenna is, the more concentrated the radiation from the antenna is, allowing the signal radiated from the antenna to be transmitted farther in a specific direction. In this embodiment, in the aforementioned frequency band, the antenna device 10, for example, has a gain of 1.55 dBi at a frequency of 2.4 GHz, and has a gain of 5.29 dBi at a frequency of 5.5 GHz.

According to the antenna device disclosed in the above embodiment, the first excitation portions and the second excitation portion are disposed on the first surface of the substrate, and the low frequency matching component is disposed on the second surface of the substrate, with the first excitation portions in symmetrical hook shapes, such that the antenna device can have or correspond a frequency band to cover the frequency band of WiFi 7, and the return loss of this frequency band can be reduced so as to meet communication requirements of WiFi 7. Accordingly, the communication quality of the antenna device in the frequency band of WiFi 7 technology can be improved.

In addition, the fourth excitation sections are flush with the first side and the second side, the second excitation portion is at least partially flush with the third side, and the grounded components are flush with the fourth side, such that the antenna device can be ensured to have or correspond to the frequency band covering the frequency band of WiFi 7, and the return loss of this frequency band can be further reduced.

It will be apparent to those skilled in the art that various modifications and variations can be made to the invention. It is intended that the specification and examples be considered as exemplary embodiments only, with the scope of the invention being indicated by the following claims.

What is claimed is:

1. An antenna device, comprising:

a substrate, having a first surface and a second surface facing away from each other;

an excitation component, disposed on the first surface, wherein the excitation component comprises two first excitation portions and a second excitation portion spaced apart from each other, the two first excitation portions are symmetrical, each of the two first excitation portions comprises a first excitation section, a second excitation section, a third excitation section, a fourth excitation section and a fifth excitation section, an end of the second excitation section is vertically connected to an end of the first excitation section, an end of the third excitation section is vertically connected to another end of the second excitation section, the third excitation section extends along a direction away from the first excitation section, an end of the fourth excitation section is vertically connected to another end of the third excitation section, the fourth excitation section extends towards the first excitation section, an end of the fifth excitation section is vertically connected to another end of the fourth excitation section, the fifth excitation section extends towards the first excitation section, and the fourth excitation sections of the two first excitation portions and the second excitation portion are adjacent to different sides of the substrate; and a low frequency matching component, disposed on the second surface, wherein the low frequency matching component is spaced apart from sides of the substrate.

2. The antenna device according to claim 1, further comprising two grounded components, wherein the two grounded components are disposed on the first surface, the two grounded components are respectively connected to ends of the first excitation sections away from the second excitation sections of the two first excitation portion, the substrate further has a first side, a second side, a third side and a fourth side sequentially connected to one another, the first side is located opposite to the second side, the third side is located opposite to the fourth side, the first side, the second side, the third side and the fourth side together surround the first surface and the second surface, the fourth excitation sections of the two first excitation portions are respectively flush with the first side and the second side, the second excitation portion is at least partially flush with the third side, and the two grounded components are flush with the fourth side.

3. The antenna device according to claim 2, further comprising two feeding components, wherein the two feeding components are disposed on the first surface, each of the two feeding components is located between the first excitation section and any of the two grounded components, a distance between each of the two feeding components and the fourth side is less than a distance between the fifth excitation sections of the two first excitation portions and the fourth side, and an overall length of the second excitation portion is less than or equal to a distance between the two feeding components.

4. The antenna device according to claim 3, wherein a length of each of the first excitation sections of the two first excitation portions is 2 millimeters, a width of each of the first excitation sections of the two first excitation portions is 0.7 millimeters, a length of each of the second excitation sections of the two first excitation portions is 2.5 millimeters, a width of each of the second excitation sections of the two first excitation portions is 0.9 millimeters, a length of each of the third excitation sections of the two first excitation portions is 4.4 millimeters, a width of each of the third excitation sections of the two first excitation portions is 1 millimeter, a length of each of the fourth excitation sections of the two first excitation portions is 1.7 millimeters, a width of each of the fourth excitation sections of the two first excitation portions is 1 millimeter, a length of each of the fifth excitation sections of the two first excitation portions is 2.6 millimeters, a width of each of the fifth excitation sections of the two first excitation portions is 1 millimeter, the distance between the fifth excitation sections of the two first excitation portions and the fourth side is 0.8 millimeters, a length of each of the two grounded components is 5 millimeters, a width of each of the two grounded components is 2.2 millimeters, a length of each of the two feeding components is 0.7 millimeters, a width of each of the two feeding components is 0.5 millimeters, and the distance between each of the two feeding components and the fourth side is 0.3 millimeters.

5. The antenna device according to claim 3, wherein the low frequency matching component comprises a first matching section and two second matching sections, the first matching section is adjacent to the fourth side, the two second matching sections are respectively connected to two opposite ends of the first matching section, the two second matching sections extend towards the third side, and a distance between the two second matching sections is greater than the distance between the two feeding components.

6. The antenna device according to claim 5, wherein a length of the first matching section is 23.6 millimeters, a width of the first matching section is 1.4 millimeters, a length of each of the two second matching section is 2 millimeters, a width of each of the two second matching section is 1.2 millimeters, and a distance between the first matching section and the fourth side is 0.6 millimeters.

7. The antenna device according to claim 2, wherein the second excitation portion comprises a sixth excitation section, two seventh excitation sections, two eighth excitation sections and two ninth excitation sections, the sixth excitation section is flush with the third side, ends of the two seventh excitation sections are respectively and vertically connected to two opposite ends of the sixth excitation section, the two seventh excitation sections extend towards the two grounded components, ends of the two eighth excitation sections are respectively and vertically connected to two another ends of the two seventh excitation sections, the two eighth excitation sections extend away from the sixth excitation section, ends of the two ninth excitation sections are respectively and vertically connected to two another ends of the two eighth excitation sections, the two ninth excitation sections extend away from the two grounded components, two ends of the two ninth excitation sections away from the two eighth excitation sections are flush with the third side, and the two eighth excitation sections are spaced apart from the two grounded components, respectively.

8. The antenna device according to claim 7, wherein a length of the sixth excitation section is 15 millimeters, a width of the sixth excitation section is 0.5 millimeters, a length of each of the two seventh excitation sections is 1.25 millimeters, a width of each of the two seventh excitation sections is 0.5 millimeters, a length of each of the two eighth excitation sections is 2 millimeters, a width of each of the two eighth excitation sections is 0.5 millimeters, a length of each of the two ninth excitation sections is 1.75 millimeters, and a width of each of the two ninth excitation sections is 0.5 millimeters.

9. The antenna device according to claim 2, further comprising a decoupling component, wherein the decoupling component is disposed on the first surface, the decoupling component comprises a first decoupling section, two second decoupling sections, two third decoupling sections, two fourth decoupling sections and a fifth decoupling section, the first decoupling section is flush with the fourth side, ends of the two second decoupling sections are respectively and vertically connected to two opposite ends of the first decoupling section, the two second decoupling sections extend towards the second excitation portion, ends of the two third decoupling sections are respectively and vertically connected to two another ends of the two second decoupling sections, the two third decoupling sections extend away from the first decoupling section, ends of the two fourth decoupling sections are respectively and vertically connected to two another ends of the two third decoupling sections, the two fourth decoupling sections extend towards the second excitation portion, two opposite ends of the fifth decoupling section are connected to two ends of the two fourth decoupling sections away from the two third decoupling sections, the fifth decoupling section is spaced apart from the second excitation portion, and the first decoupling section and at least part of the two second decoupling sections are located between the two grounded components.

10. The antenna device according to claim 9, wherein a length of the first decoupling section is 4 millimeters, a width of the first decoupling section is 1 millimeters, a distance between the first decoupling section and each of the two grounded components is 2 millimeters, a length of each of the two second decoupling sections is 1.6 millimeters, a width of each of the two second decoupling sections is 0.7 millimeters, a length of each of the two third decoupling sections is 2.7 millimeters, a width of each of the two third decoupling sections is 0.4 millimeters, a length of each of the two fourth decoupling sections is 0.8 millimeters, a width of each of the two fourth decoupling sections is 0.5 millimeters, a length of the fifth decoupling section is 8 millimeters, a width of the fifth decoupling section is 0.5 millimeters, and a distance between the fifth decoupling section and the second excitation portion is greater than or equal to 0.2 millimeters.

* * * * *